(12) United States Patent
Wang et al.

(10) Patent No.: US 9,329,417 B2
(45) Date of Patent: May 3, 2016

(54) METHOD OF REPAIRING DISPLAY PANEL, AND DISPLAY PANEL

(71) Applicants: BOE Technology Group Co., Ltd., Beijing (CN); Hefei Xinsheng Optoelectronics Technology Co., Ltd., Anhui (CN)

(72) Inventors: Jihua Wang, Beijing (CN); Tao Wu, Beijing (CN); Dong Guo, Beijing (CN); Hengliang Fan, Beijing (CN); Tao Li, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 83 days.

(21) Appl. No.: 14/514,613

(22) Filed: Oct. 15, 2014

(65) Prior Publication Data
US 2015/0370101 A1 Dec. 24, 2015

(30) Foreign Application Priority Data
Jun. 24, 2014 (CN) .......................... 2014 1 0290307

(51) Int. Cl.
*G02F 1/13* (2006.01)
(52) U.S. Cl.
CPC .................................... *G02F 1/1309* (2013.01)
(58) Field of Classification Search
CPC ...................................................... G02F 1/1309
USPC ...................................................... 445/2, 61
See application file for complete search history.

(56) References Cited

U.S. PATENT DOCUMENTS

| | | | |
|---|---|---|---|
| 2008/0158127 A1* | 7/2008 | Chang ............... | G02F 1/136259 345/93 |
| 2011/0273640 A1* | 11/2011 | Zhang .................. | G02F 1/1309 349/43 |
| 2013/0215354 A1* | 8/2013 | Yoon ..................... | G02F 1/1309 349/46 |
| 2015/0185513 A1* | 7/2015 | Wu .................... | G02F 1/134363 257/72 |

* cited by examiner

*Primary Examiner* — Donald Raleigh
*Assistant Examiner* — Kevin Quarterman
(74) *Attorney, Agent, or Firm* — West, Champlin & Koehler, P.A.

(57) ABSTRACT

The present invention discloses a method for repairing a display panel, in which a path for electrically connecting two ends of an opened data line at an opened part thereof is formed by using first line segments and a first common electrode, wherein each of the first line segments is a part of one of common electrode lines in the display panel intersecting the opened data line, and the first common electrode is one of a plurality of common electrodes in a pixel array that is electrically connected with the first line segments. Further, a welding process is performed at an intersecting region between the first line segments and the opened data line to form an electrical connection, and electrical connections between the path and other common electrode lines and other common electrodes outside the path are cut off. This method for repairing data lines employs existing common electrode lines and common electrodes to repair an opened data line, so that no additional repairing line needs to be disposed in the display panel to facilitate a narrow bezel design of the display panel and thus repairing the data lines is no longer limited by the number of the repairing lines. Furthermore, the influence on data signals is negligible because no new line is introduced.

12 Claims, 6 Drawing Sheets

# METHOD OF REPAIRING DISPLAY PANEL, AND DISPLAY PANEL

CROSS-REFERENCE TO RELATED APPLICATION

This application claims the benefit of Chinese Patent Application No. 201410290307.X filed on Jun. 24, 2014 in the State Intellectual Property Office of China, the whole disclosure of which is incorporated herein by reference.

BACKGROUND OF THE INVENTION

1. Field of the Invention

Embodiments of the present invention generally relate to the technical field of display, and especially to a method of repairing a display panel and a display panel obtained by the method.

2. Description of the Related Art

Recently, during manufacturing a liquid crystal display (LCD) panel, there is a large probability that a Data Open (DO) region or a opened part may be generated in data lines within an existing array substrate structure of a LCD due to influences from uneven surface of the substrate, processes such as heat treatment, etching or the like, and narrow widths of the data lines. When a data line is opened, a signal cannot be transferred to corresponding pixel region, and therefore the LCD panel cannot function properly.

If an opened data line is detected before assembling the liquid crystal display panel, the opened data line may be repaired through a chemical vapor deposition (CVD) process. In practical operation, however, there is a large probability that the opened data lines are left undetected. Therefore, the opened data lines are detected after assembling an array substrate and an opposite substrate of the LCD panel in most cases. In such a case, the existing repairing method utilizing the CVD process is no longer applicable.

Figure 1:
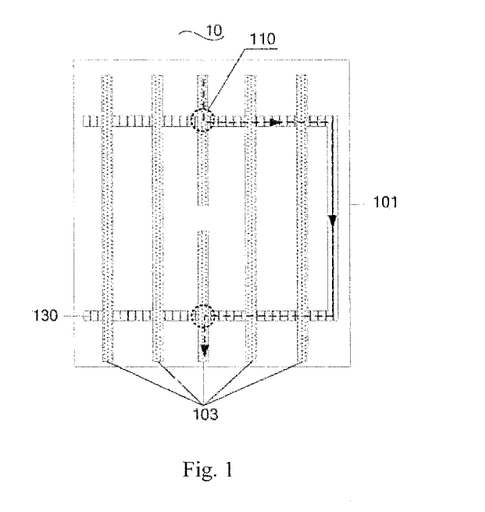
FIG. 1 is a schematic structural diagram showing a method of repairing a display panel in prior arts.

In order to solve the issue that an opened data line is detected after assembling the LCD panel, a current repairing method comprises, as shown in FIG. 1, forming a repairing line 130 at a peripheral region of an array substrate 10, using a high temperature of a laser beam passing through a underlying substrate 101 of the array substrate 10 to fuse a crossed overlapped region 110 between an opened data line 103 and the repairing line 130 so as to weld the opened data line 103 and the repairing line 130 together, such that a conduction path (as shown in a direction of current indicated by the arrow in FIG. 1) is formed by the opened data line 101 and the repairing line 130, and the Data Open issue is solved.

Since a size of an LCD panel is being gradually increased, and a corresponding longer repairing line needs to be provided on the array substrate, and the resistance and the capacitance of the repairing line are also gradually increased. Therefore, after the path is formed through welding the opened data line and the repairing line together, an attenuation effect on the signal transmitted through the data line caused by the resistance and the capacitance of the repairing line is enhanced, thereby adversely affecting display performance of the repaired LCD panel. Furthermore, repairing the data lines is limited by the number of the repairing lines which can be provided on the array substrate. Still further, production cost will be increased due to increased number of repairing lines, which also has disadvantages in narrow bezel design of LCD panels.

SUMMARY OF THE INVENTION

The present invention has been made to overcome or alleviate at least one aspect of the above mentioned disadvantages.

Accordingly, an object of the present invention is to provide a method for repairing a display panel and a display panel obtained by the method, which can reduce data line signal loss caused by overlong repairing lines, avoid the repairing of the data lines from being limited by the number of the repairing lines, and increase the effect of repairing data lines in the array substrate.

According to an aspect of the present invention, there is provided a method for repairing a display panel, comprising steps of:

determining a location of an opened part of an opened data line in the display panel, and a position relation between the opened part and common electrode lines in the display panel, wherein a common electrode of each pixel of the display panel is electrically connected to adjacent common electrode lines;

determining a path for electrically connecting two ends of the opened data line at the opened part based on the location of the opened part of the opened data line and the position relation between the opened part and the common electrode lines, said path comprising at least:

first line segments, which are located in at least two common electrode lines located at two sides of the opened part respectively and intersect the opened data line; and a first common electrode of the common electrodes for electrically connecting the first line segments;

welding the opened data line to the first line segments at an intersecting region between the opened data line and the first line segments in the path to form a welded part; and cutting off electrical connections between the path and other common electrode lines and other common electrodes outside the path, so as to form the path that electrically connects the two ends of the opened data line at the opened part.

According to another aspect of the present invention, there is provided a display panel obtained by using the above method.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
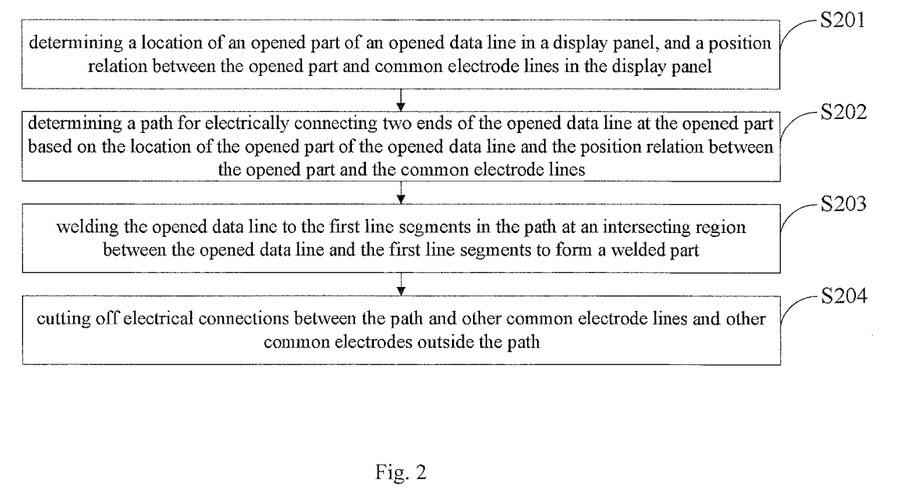
FIG. 2 is a flowchart showing a method of repairing a display panel according to an exemplary embodiment of the present invention.

As shown in FIG. 2, a method of repairing a display panel according to an embodiment of the present invention may comprises the following steps:

S201: determining a location of an opened part of an opened data line in the display panel, and a position relation between the opened part and common electrode lines in the display panel.

Figure 3:
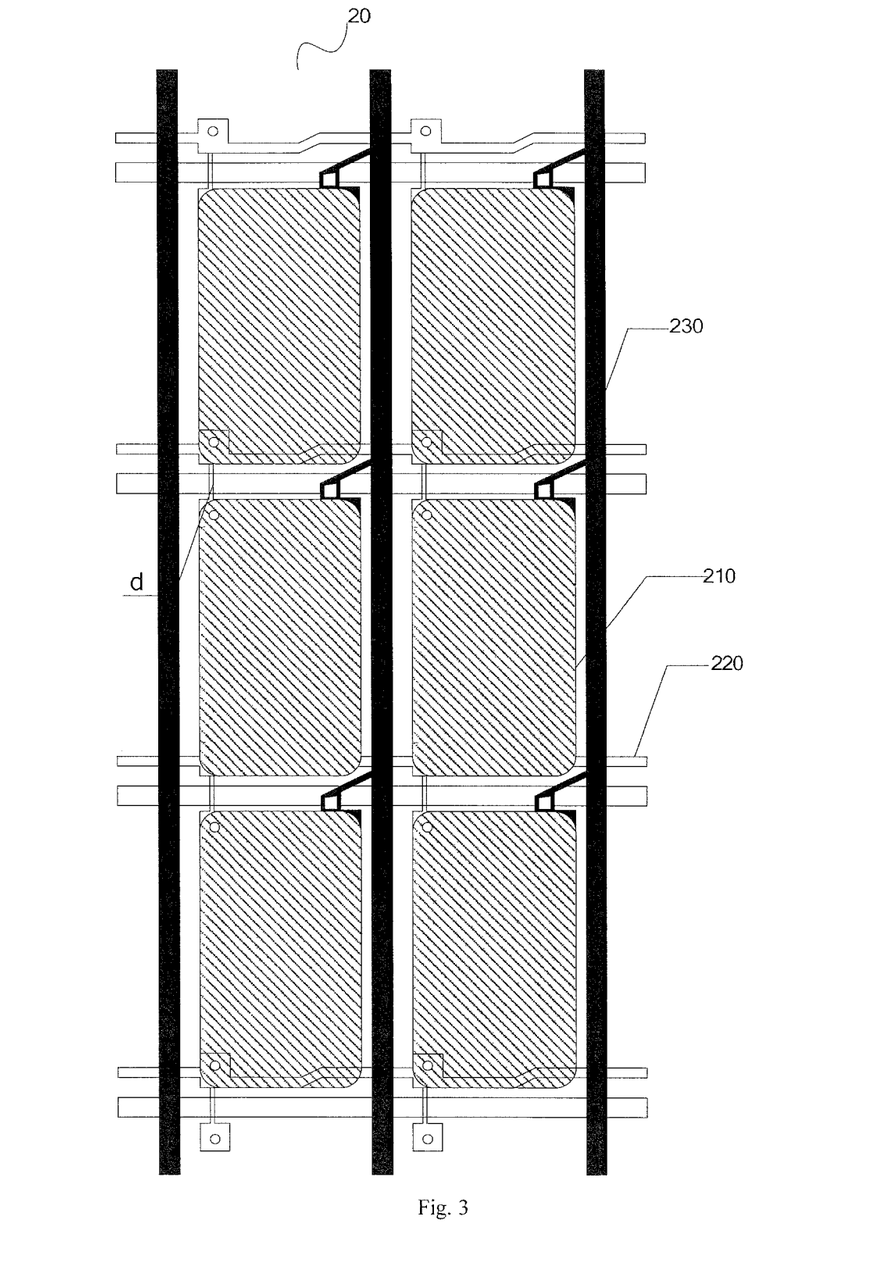
FIG. 3 is a schematic structural diagram showing an array substrate, to which a method of repairing a display panel according to an exemplary embodiment of the present invention is applicable.

In an exemplary display panel shown in FIG. 3, a plurality of common electrodes 220 for respective pixels of an array substrate 20 are independent with one another and are electrically connected to adjacent common electrode lines 220 respectively. A plurality of data lines 230 intersect (such as, perpendicularly intersect) the common electrode lines 220 respectively and are electrically connected to drain electrodes of thin-film transistors of corresponding pixels. Each common electrode 220 is located between two adjacent data lines 230. Therefore, the repairing method of the present invention can be well suitable to LCD panels in which the common electrodes 210 are located on the array substrate 20, such as LCD panels of IPS and ADS types. As shown, each common electrode 210 may be connected to its corresponding common electrode line via a lead wire d, or the common electrodes 210 may be connected with one another directly and then connected to corresponding common electrode lines, which is not limited herein.

In one example, a lighting detection way may be used to determine whether or not there is a opened data line in a display panel.

Exemplarily, the determined location of the opened part may comprise coordinates of the opened data line in which the opened part is located, and coordinates of the opened part in the opened data line.

It should be noted that there may be a plurality of opened data lines in one display panel. Typically, one data line may only have one opened part therein, such as the opened part A shown in FIGS. 4a, 4b, 5a and 5b. However, it does not exclude the case in which one data line may have a plurality of opened parts therein.

S202: determining a path for electrically connecting two ends of the opened data line at the opened part based on the location of the opened part of the opened data line and the position relation between the opened part and the common electrode lines, said path at least comprising first line segments, which are located in at least two common electrode lines located at two sides of the opened part respectively and intersect the opened data line, and a first common electrode of the common electrodes electrically connecting the first line segments For example, the first common electrode and the connected first line segments in the path for electrically connecting the two ends of the opened data line at the opened part may comprise one common electrode adjacent to the opened part and two first line segments, or may comprise a plurality of common electrodes adjacent to the opened part and a plurality of first line segments, which is not limited herein. Of course, the larger the number of the first common electrodes and the first line segments in the path is, the larger the number of dark pixel spots caused by repairing of the data lines is. Therefore, in order to avoid those dark pixel spots caused by repairing the data lines, the number of the first common electrodes and the first line segments should be selected as small as possible while meeting the need for repairing the data lines.

S203: welding the opened data line to the first line segments in the path at an intersecting region between the opened data line and the first line segments to form a welded part, such as the welded part D shown in FIGS. 4a, 4b, 5aand 5b.

Exemplarily, the intersecting region may be melted through energy of a irradiated laser beam to form an electrical connection.

S204: cutting off electrical connections between the path and other common electrode lines and other common electrodes outside the path, so as to form the path that electrically connects the two ends of the opened data line at the opened part.

In one example, the step S204 may comprise disconnecting each of the first line segments in the path from the common electrode line in which the first line segment is located, and cutting off electrical connections between the first common electrode in the path and other common electrode lines except the first line segments, which will be further described in detail below.

Exemplarily, the cutting off may be achieved by using a laser beam irradiation method, that is, by means of energy of the laser beam, each first line segment is disconnected from the common electrode line in which the first line segment is located, and the electrical connections between the first common electrode and other common electrode lines except the first line segments is cut off.

It is noted that when cutting off the first line segments, the cutting position (for example, the position indicated by the dotted line Y that extends in parallel with the data lines, as shown in FIGS. 4a, 4b, 5a, and 5b) should be selected so that there is no other patterns except for a pattern of the first line segments at the cutting position, so as to avoid any unnecessary conduction or electrical connection between the first line segments and the other patterns. When cutting off the connections between the first common electrode in the path and all the common electrode lines except the first line segments, the cutting position (for example, the position indicated by a dotted line X that extends in parallel with the common electrode lines, as shown in FIGS. 4a, 4b, 5a, and 5b) should be selected so that there is no other patterns except for a pattern of the first common electrode and/or the common electrode lines, so as to avoid any unnecessary conduction or electrical connection between the first common electrode and/or the common electrode lines and the other patterns.

It should be noted that the steps S203 and S204 are interchangeable or reversible, and the step of cutting off the first line segments and the step of cutting off the electrical connections between the first common electrode and all the common electrode lines except the first line segments are also interchangeable or reversible. The present invention is not limited by the sequences of these steps.

In the method provided in embodiments of the present invention, the path for electrically connecting the two ends of the opened data line at the opened part is formed by the first line segments and the first common electrode, wherein each of the first line segments is a part of a common electrode line which is located in the display panel and intersects the opened data line, and the first common electrode is one of a plurality of common electrodes in the pixel array that electrically connects the first line segments. A welding process is performed at intersecting regions between the first line segments and the data line to form welded parts for electrical connections therebetween, and the electrical connections between the path and other common electrode lines and other common electrodes outside or except the path are cut off. For example, the path is formed by cutting off each first line segment from the common electrode line in which the first line segment is located and cutting off all other electrical connections between the first common electrode and other common electrode lines except the first line segments. This method for repairing data lines uses existing common electrode lines and common electrodes to repair an opened data line, so that no repairing line needs to be disposed in the display panel, and this method is advantageous in narrow bezel design of the LCD panels. Furthermore, the influence on data signals is negligible because no new line is introduced. Still further, the repairing of the data lines is no longer limited by the number of the repairing lines.

Figure 4A:
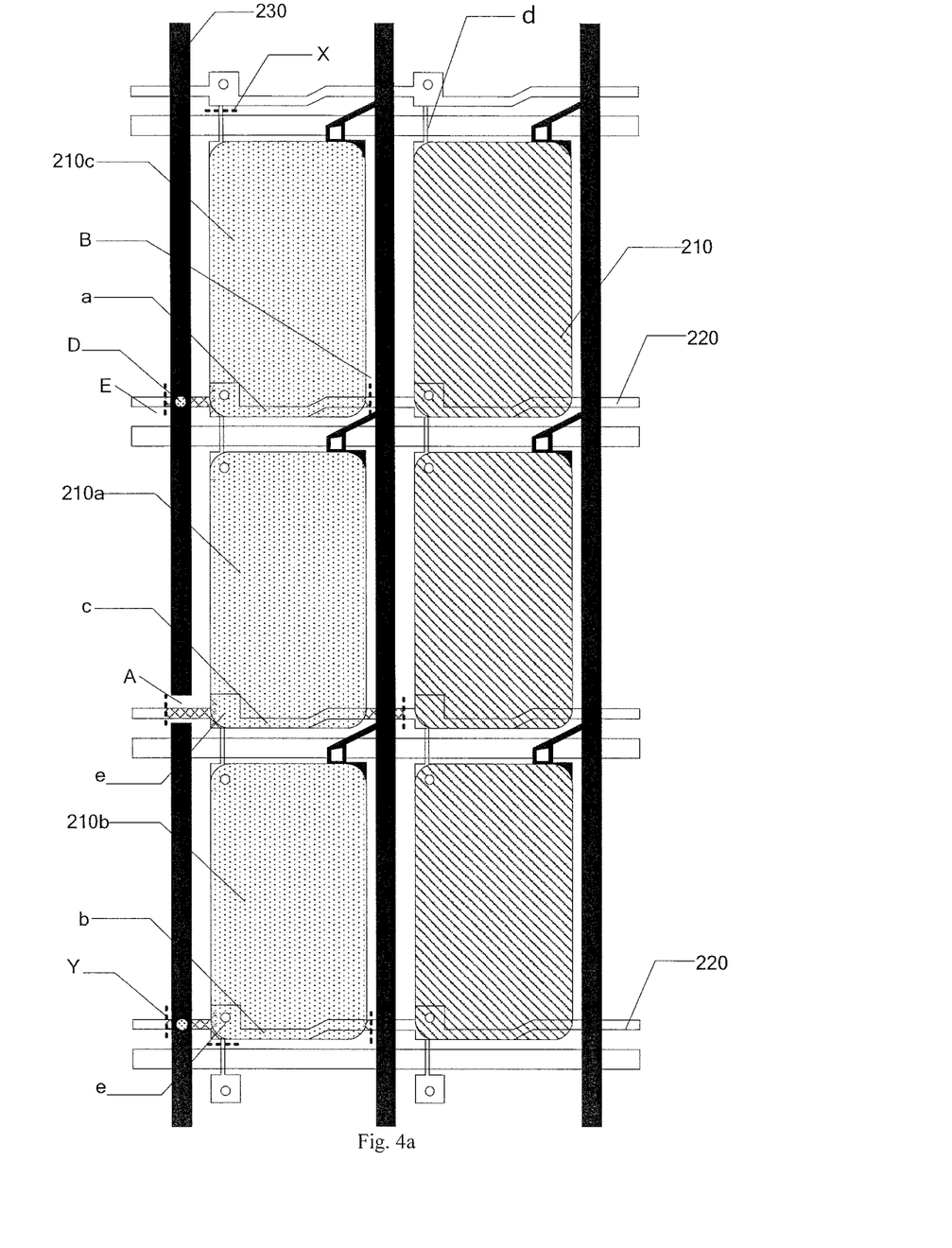
FIG. 4a is a schematic structural diagram showing an example of an array substrate of a display panel repaired by using a method of repairing a display panel according to an exemplary embodiment of the present invention.
Figure 4B:
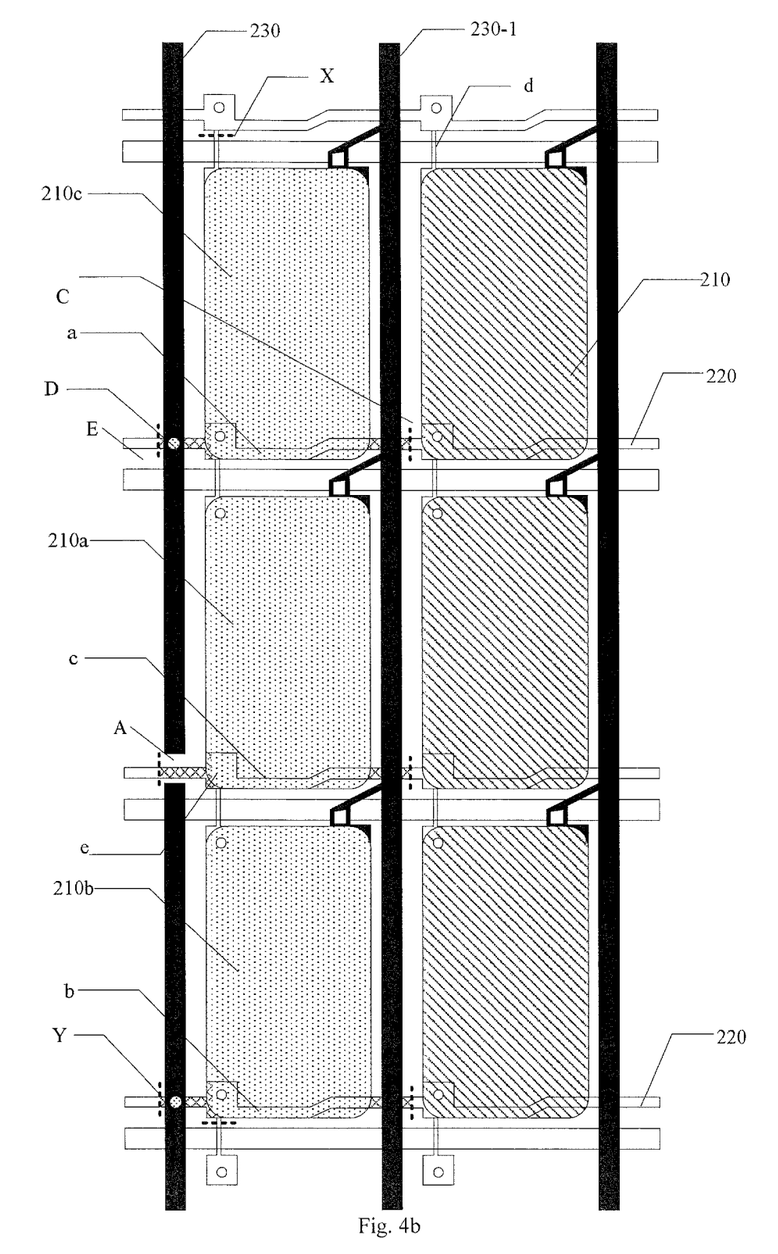
FIG. 4b is a schematic structural diagram showing another example of an array substrate of a display panel repaired by using a method of repairing a display panel according to another exemplary embodiment of the present invention.
Figure 5A:
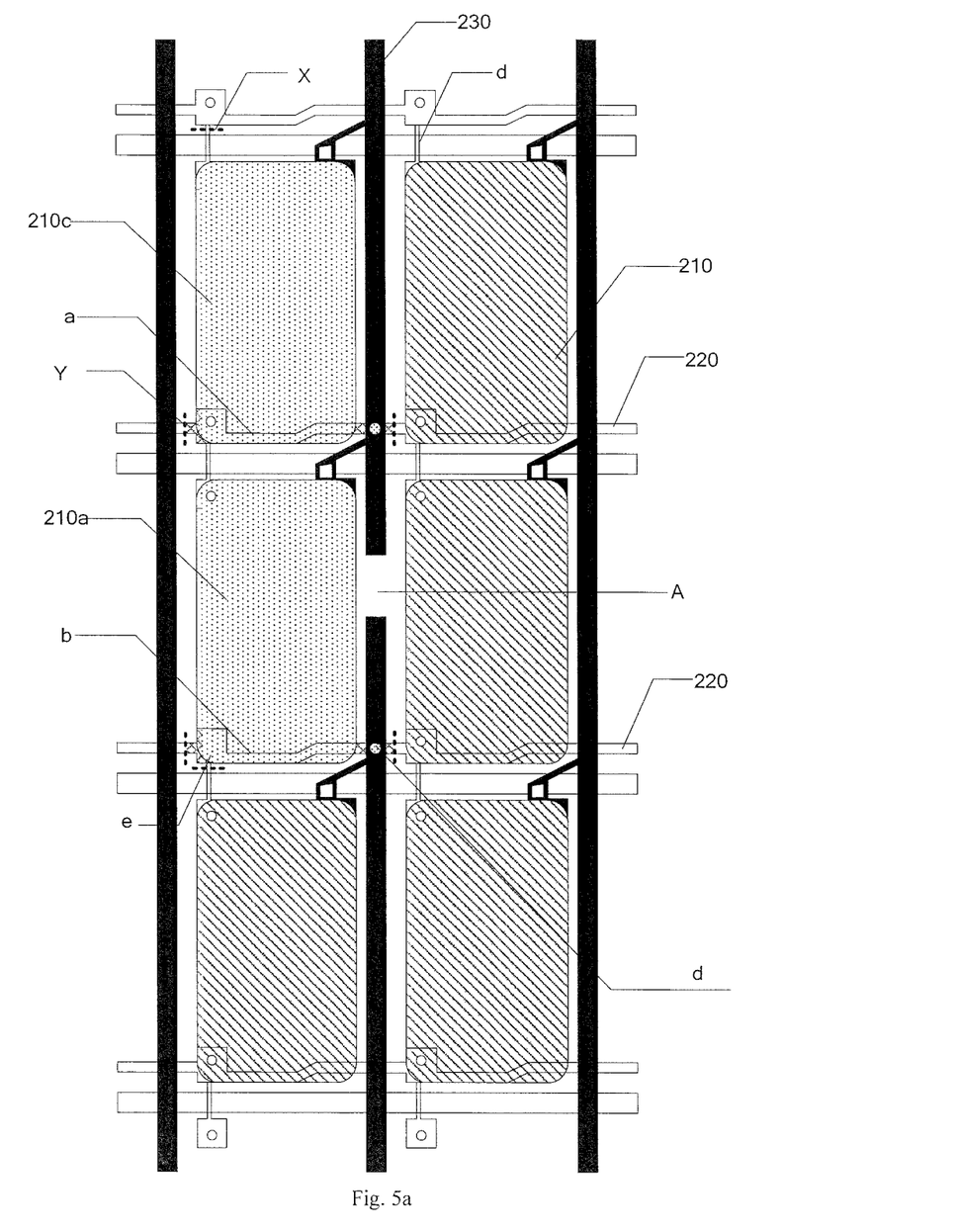
FIG. 5a is a schematic structural diagram showing a further example of an array substrate of a display panel repaired by using a method of repairing a display panel according to a further exemplary embodiment of the present invention.
Figure 5B:
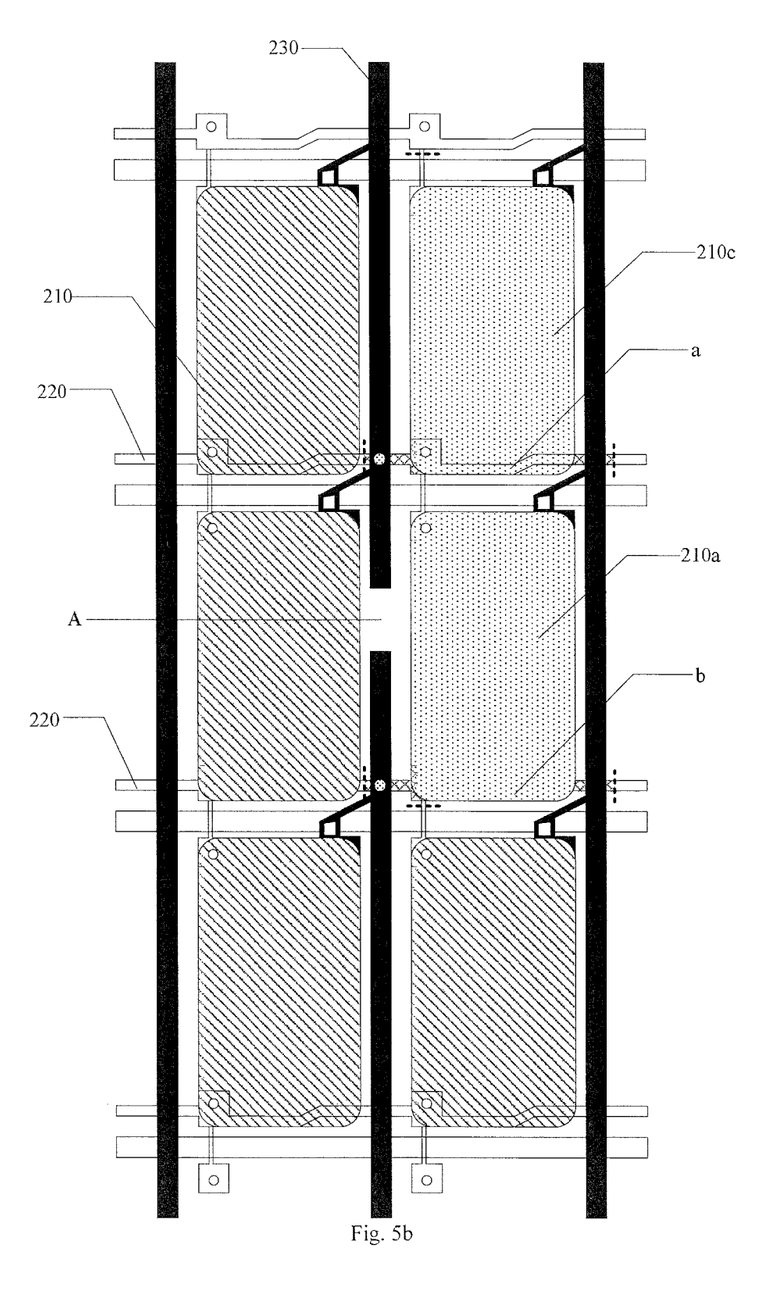
FIG. 5b is a schematic structural diagram showing a still further example of an array substrate of a display panel repaired by using a method of repairing a display panel according to still further exemplary embodiment of the present invention.

In an illustrative example of the repairing method according to embodiments of the present invention, the step S201 of determining the position relation between the opened part and the common electrode lines of the display panel may be achieved as follows or may comprise:

if it is determined that there is an opened data line in the display panel, determining whether or not an opened part A of the opened data line intersects an common electrode line 220:

determining that the opened part is located within a row gap of pixels if it is determined that the opened part A intersects the common electrode line 220, as shown in FIGS. 4a, and 4b; and if it is determined that the opened part A does not intersect any common electrode line 220, determining that the opened part is located within a column gap of the pixels, i.e., the opened part is located between two adjacent common electrode lines 220, as shown in FIGS. 5a, and 5b.

When it is determined that the opened part is located within a column gap of the pixels, i.e., the opened part is located between two adjacent common electrode lines 220 as shown in FIGS. 5a, and 5b, the determined path for electrically connecting the two ends of the opened data line 230 at the opened part A comprises: two first line segments a, b, which are located respectively in the two common electrode lines 220 adjacent to the opened part A and intersect the data line 230, and a first common electrode 210a which is located in a pixel adjacent to one side of the opened part, wherein the first common electrode 210a is electrically connected to the two first line segments a and b, respectively.

Therefore, the path for electrically connecting the two ends of the opened data line 230 at the opened part A may be formed by one first common electrode 210a and two connected first line segments a, b. In practice, the path may be located at left side of the opened data line 230 as shown in FIG. 5a, or at right side of the opened data line 230 as shown in FIG. 5b, which is not limited herein.

On the other hand, when it is determined that the opened part A is located within a row gap of the pixels, i.e., the opened part A is located above or below a certain common electrode line 220 as shown in FIGS. 4a and 4b, the determined path for electrically connecting the two ends of opened data line 230 at the opened part A further comprises a second line segment c located in the common electrode line 220 intersecting the opened part A. That is to say, the path comprises: the second line segment c located in the common electrode line 220 intersecting the opened part A; the first line segments a and b, which are adjacent to the second line segment c respectively, are provided in the two common electrode lines 220 located at both sides of the second line segment c respectively, and intersect the opened data line 230; and first common electrodes 210a, 210b, which are in two pixels located at both sides of the second line segment c respectively, wherein each of the first common electrodes 210a, 210b is electrically connected to the second line segment c respectively. In one example, each of the first common electrodes 210a, 210b may be electrically connected to the second line segment c via a lead wire d respectively, or the first common electrodes 210a, 210b may be electrically connected with each other directly and then connected to the second line segment c, which is not limited herein.

In this way, the path for electrically connecting the two ends of the opened data line 230 at the opened part A may be formed by two first common electrodes 210a, 210b, two first line segments a, b connected to the two first common electrodes 210a, 210b respectively, and one second line segment c. In practice, the path may be located at left side of the opened data line 230 (not shown), or at right side of the opened data line 230 as shown in FIGS. 4a and 4b, which is not limited herein.

In the repairing method provided in embodiments of the present invention, when the path comprises the second line segment c, in addition to the steps S203 and S204, the second line segment c is further cut off, at both sides of the connection (e.g., indicated by a mark e) between the second line segment c and the first common electrodes 210a, 210b, from the common electrode line 220 in which the second line segment c is located along an extension direction (e.g., the direction indicated by a dotted line Y) of the data line 230, after the repairing path is determined. Specifically, cutting off the second line segment from the common electrode line 220 may be achieved through irradiation of a laser beam.

In order to ensure that each pixel has a relative larger aperture ratio, in actual display panel, as shown in FIG. 3, the common electrode line 220 is typically positioned to be overlapped with the each common electrode 210 of each pixel of a row in which the common electrode line 220 is located. That is to say, corresponding common electrode line 220 and common electrode 210 are at least partly overlapped with each other. In this case, the path determined in step S202 of the repairing method provided in the embodiments of the present invention further comprises a second common electrode 210c in addition to the first common electrodes 210a, 210b, as shown in FIGS. 4a, 4b, 5a, and 5b.

Accordingly, in the repairing method provided in the embodiments of the present invention, after the repairing path is determined, the following step is further carried out in addition to the steps S203 and S204: cutting off the connection between the second common electrode 210c in the path and the common electrode line 220 except the first line segments a, b. Specifically, this cutting off step may also be achieved through irradiation of a laser beam.

Furthermore, in a display panel having a structure in which each common electrode line is disposed to be overlapped with the common electrode in each pixel of the row in which the common electrode line is located, in order to ensure that the cutting off of the first line segments a, b will not affect other patterns in the display panel, the step of cutting off the first line segments a, b from the common electrode line, in which the first line segments a, b are located, at both sides of the welded part d along the extension direction of the data line 230, may be carried out through the following two ways:

In the first way, as shown in FIG. 4a, along the extension direction of the data line 230, one end of each first line segments a, b is cut off from the common electrode line 220, in which the first line segment is located, at an neighboring gap portion (indicated by a mark E) on one side of the welded part d away from its corresponding first common electrode 210a or 210b, and the other end of each first line segments a, b is cut off from the common electrode line 220, in which the first line segment is located, at an neighboring gap portion B on one side of the first common electrode 210a or 210b that is away from its corresponding welded part d.

In the second way, as shown in FIG. 4b, along the extension direction of the data line, one end of each first line segments a, b is cut off from the common electrode line 220, in which the first line segment is located, at a first neighboring gap portion E on one side of the welded part d away from its corresponding first common electrode, and the other end of each first line segments a, b is cut off from the common electrode line 220, in which the first line segment is located, at a second neighboring gap portion C on one side of another data line 230-1 opposite to the first common electrode and adjacent the opened data line, wherein the another data line 230-1 is located on a side of the first common electrodes 210a, 210b opposite from the opened data line 230.

It is noted that each of the above neighboring gap portions is a gap between a data line and its corresponding common electrode.

In an actual display panel, a width of the neighboring gap B is generally smaller than that of the neighboring gap C. In one exemplary embodiment, in general, the width of the neighboring gap B is about 1.94 μm, while the width of the neighboring gap C is about 3.96 μm. Therefore, the second way is usually chosen to carry out the cutting procedure in order to increase rate of success in cutting.

Based on the same inventive concept as the above method, the present invention further provides a display panel, which is obtained through the method as described above in the embodiments of the invention. For example, the display panel may be used in mobile phones, tablets, TV sets, displays, notebook PCs, digital frames, navigators and other products or parts having a displaying function.

In the repairing method and the display panel obtained by the method as described above in the embodiments of the present invention, the path for electrically connecting or conducting the two ends of the opened data line at the opened part thereof is formed by the first line segments and the first common electrode, wherein each first line segment is a part of a common electrode line of the display panel intersecting the opened data line, and the first common electrode is one of a plurality of common electrodes in the pixel array that electrically connects the first line segments. A welding process is performed at intersecting regions between the first line segments and the opened data line to form electrical connections therebetween, and the electrical connections between the path and other common electrode lines and other common electrodes except or outside the path (that is, the common electrode lines and other common electrodes which do not constitute the path) are cut off. For example, the path is formed by cutting off each first line segment from the common electrode line in which the first line segment is located and cutting off all other electrical connections between the first common electrode and other common electrode lines except the first line segments. This method for repairing data lines uses existing common electrode lines and common electrodes to repair an opened data line, so that no repairing line needs to be disposed in the display panel, and this method is advantageous in narrow bezel design of the LCD panels. Furthermore, the influence on data signals is negligible because no new line is introduced. Still further, the repairing of the data lines is no longer limited by the number of the repairing lines.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A method for repairing a display panel, comprising steps of:
   determining a location of an opened part of an opened data line in the display panel, and a position relation between the opened part and common electrode lines in the display panel, wherein a common electrode for each pixel of the display panel is electrically connected to adjacent common electrode lines;
   determining a path for electrically connecting two ends of the opened data line at the opened part based on the location of the opened part of the opened data line and the position relation between the opened part and the common electrode lines, said path comprising at least:
      first line segments, which are located in at least two common electrode lines located at two sides of the opened part respectively and intersect the opened data line; and
      a first common electrode of the common electrodes electrically connecting the first line segments;
   welding the opened data line to the first line segments in the path at an intersecting region between the opened data line and the first line segments to form a welded part; and
   cutting off electrical connections between the path and other common electrode lines and other common electrodes outside the path, so as to form the path that electrically connects the two ends of the opened data line at the opened part.

2. The method according to claim 1, wherein the step of cutting off electrical connections between the path and the other common electrode lines and the other common electrodes outside the path comprises:
   disconnecting each of the first line segments in the path from the common electrode line in which the first line segment is located, and
   cutting off electrical connections between the first common electrode in the path and other common electrode lines except the first line segments.

3. The method according to claim 2, wherein the step of disconnecting each first line segments in the path from the common electrode line in which the first line segment is located comprises:
   cutting off, at locations on both sides of the welded part, each of the first line segments from the common electrode line in which the first line segment is located.

4. The method according to claim 1, wherein the step of determining the position relation between the opened part and the common electrode lines in the display panel comprises:
   determining whether the opened part intersects the common electrode lines if it is determined that there is an opened data line in the display panel, wherein it is determined that the opened part is located within a row gap of the pixels if it is determined that the opened part intersects the common electrode lines, and it is determined that the opened part is located within a column gap of the pixels if it is determined that the opened part does not intersect the common electrode lines.

5. The method according to claim 4, wherein when it is determined that the opened part is located within the column gap of the pixels, the deteimined path for electrically connecting the two ends of the opened data line at the opened part comprises:
two first line segments, which are located in two common electrode lines adjacent to the opened part and intersect the opened data line, and
the first common electrode, which is located in a pixel adjacent to one side of the opened part, wherein the first common electrode is electrically connected to the two first line segments respectively.

6. The method according to claim 4, wherein
if it is determined that the opened part is located within the row gap of the pixels, the determined path for electrically connecting the two ends of the opened data line at the opened part further comprises a second line segment which is located in the common electrode line intersecting the opened part,
wherein the first line segments are adjacent to the second line segment and are located at both sides of the second line segment respectively, and wherein the first common electrode comprises common electrodes located in two pixels on both sides of the second line segment respectively and electrically connected to the second line segment.

7. The method according to claim 6, further comprising
cutting off, at both sides of a connection between the second line segment and the first common electrodes, the second line segment from the common electrode line in which the second line segment is located.

8. The method according to claim 1, wherein
in the display panel, each common electrode line is at least partly overlapped with the common electrodes in respective pixels within a row in which the common electrode line is located; and
the path further comprises, in addition to the first common electrode, a second common electrode connected to the first line segments.

9. The method according to claim 8, further comprising
cutting off an electrical connection between the second common electrode in the path and other common electrode lines except the first line segments.

10. The method according to claim 3, wherein the step of cutting off, at locations on both sides of the welded part, each of the first line segments from the common electrode line in which the first line segment is located comprises:
cutting off, at a neighboring gap portion on a side of the welded part away from its corresponding first common electrode, one end of each first line segment from the common electrode line in which the first line segment is located, and
cutting off, at a neighboring gap portion on a side of the first common electrode away from its corresponding welded part, the other end of each first line segment from the common electrode line in which the first line segment is located.

11. The method according to claim 3, wherein the step of cutting off, at locations on both sides of the welded part, each of the first line segments from the common electrode line in which the first line segment is located comprises:
cutting off, at a first neighboring gap portion, one end of each first line segment from the common electrode line in which the first line segment is located, wherein the first neighboring gap portion is located on one side of the welded part away from its corresponding first common electrode, and
cutting off, at a second neighboring gap portion, the other end of each first line segment from the common electrode line in which the first line segment is located, wherein the second neighboring gap portion is located on one side of another data line opposite from the first common electrode, wherein the another data line is adjacent to the opened data line and is located on a side of the first common electrodes opposite from the opened data line.

12. A display panel obtained by using the method according to claim 1.

* * * * *